US010451107B2

(12) United States Patent
Ehrhard

(10) Patent No.: US 10,451,107 B2
(45) Date of Patent: Oct. 22, 2019

(54) METHOD FOR MOUNTING A ROLLING BEARING UNIT ON THE ROTOR OF A TURBOCHARGER

(71) Applicant: CONTINENTAL AUTOMOTIVE GMBH, Hannover (DE)

(72) Inventor: Jan Ehrhard, Wiesloch (DE)

(73) Assignee: CPT Group GmbH, Hannover (DE)

( * ) Notice: Subject to any disclaimer, the term of this patent is extended or adjusted under 35 U.S.C. 154(b) by 0 days.

(21) Appl. No.: 15/898,594

(22) Filed: Feb. 18, 2018

(65) Prior Publication Data

US 2018/0180094 A1 Jun. 28, 2018

Related U.S. Application Data

(63) Continuation of application No. PCT/EP2016/065256, filed on Jun. 30, 2016.

(30) Foreign Application Priority Data

Aug. 18, 2015 (DE) .................... 10 2015 215 750

(51) Int. Cl.
*F16C 33/58* (2006.01)
*F16C 25/08* (2006.01)
(Continued)

(52) U.S. Cl.
CPC .......... *F16C 25/083* (2013.01); *F16C 19/185* (2013.01); *F16C 19/54* (2013.01); (Continued)

(58) Field of Classification Search
CPC ..... F16C 2360/24; F16C 25/083; F16C 33/64
See application file for complete search history.

(56) References Cited

U.S. PATENT DOCUMENTS 3,651,550 A * 3/1972 Bennett ................ F16C 19/183
29/898.09
4,476,614 A * 10/1984 Pittroff .................. F16C 25/083
29/898.09
(Continued)

FOREIGN PATENT DOCUMENTS

CN 102812261 A 12/2012
CN 103180570 A 6/2013
(Continued)

OTHER PUBLICATIONS

Karl-Heinz Bauer, et al, Serienproduktion von kugelgelagerten Turboladern in hohen stückzahlen,MTZ, 72 Jg., Apr. 2011, S. 302-307.
(Continued)

*Primary Examiner* — Thomas R Hannon

(57) ABSTRACT

A method for mounting a rolling bearing arrangement onto a rotor and into the bearing housing of a turbocharger is provided. The method includes inserting a component, which is deformable under the exertion of pressure, into the intermediate space between two rolling bearings of the rotor assembly. The rotor assembly includes a rotor shaft, inner bearing rings which are fastened to the rotor shaft or integrated into the rotor shaft and which have a spacing to one another, rolling elements which are inserted into the inner bearing rings, and outer bearing rings which likewise have a spacing to one another. The method also includes deforming, by exertion of pressure, the component that has been inserted into the intermediate space between the two rolling bearings, to set a desired axial preload between the two rolling bearings.

18 Claims, 7 Drawing Sheets

(51) Int. Cl.
*F16C 19/18* (2006.01)
*F16C 19/54* (2006.01)

(52) U.S. Cl.
CPC ............ *F16C 33/58* (2013.01); *F16C 33/581* (2013.01); *F16C 2360/24* (2013.01)

(56) References Cited

U.S. PATENT DOCUMENTS

| | | | | |
|---|---|---|---|---|
| 4,492,018 | A * | 1/1985 | Rode | F16C 25/08 |
| | | | | 29/437 |
| 4,611,935 | A * | 9/1986 | Rode | F16H 1/14 |
| | | | | 384/548 |
| 4,676,667 | A | 6/1987 | Komatsu et al. | |
| 6,684,506 | B2 * | 2/2004 | Rode | F16C 19/548 |
| | | | | 29/407.02 |
| 9,835,197 | B2 * | 12/2017 | Szpara | F16C 19/548 |
| 2007/0036477 | A1 | 2/2007 | McKeirnan | |
| 2011/0171012 | A1 | 7/2011 | Vetters et al. | |
| 2013/0202432 | A1 | 8/2013 | House et al. | |
| 2014/0369865 | A1 | 12/2014 | Marsal et al. | |
| 2015/0078696 | A1 | 3/2015 | Schmidt | |

FOREIGN PATENT DOCUMENTS

| | | |
|---|---|---|
| CN | 104220706 A | 12/2014 |
| DE | 3541702 A1 | 5/1987 |
| DE | 4334339 A1 | 4/1995 |
| DE | 102006025551 A1 | 12/2007 |
| DE | 102010054939 A1 | 6/2012 |
| DE | 112010001779 T5 | 8/2012 |
| DE | 102014212155 A1 | 12/2015 |
| DE | 102014220618 B3 | 3/2016 |
| WO | 2012079881 A1 | 6/2012 |

OTHER PUBLICATIONS

International Search Report and Written Opinion dated Aug. 9, 2016 from corresponding International Patent Application No. PCT/EP2016/065256.
German Office Action dated May 19, 2016 for corresponding German Patent Application No. 10 2015 215 750.4.
First Office Action and Search Report, dated Jan. 31, 2019, for counterpart CN patent application 201680048087.7.
Translation of International Preliminary Search Report on Patentability and Written Opinion of the International Search Authority, dated Feb. 20, 2018, for PCT patent application PCT/EP2016/065256.

* cited by examiner

METHOD FOR MOUNTING A ROLLING BEARING UNIT ON THE ROTOR OF A TURBOCHARGER

CROSS-REFERENCE TO RELATED APPLICATIONS

This application claims the benefit of PCT Application PCT/EP2016/065256, filed Jun. 30, 2016, which claims priority to German Patent Application 10 2015 215 750.4, filed Aug. 18, 2015. The disclosures of the above applications are incorporated herein by reference.

TECHNICAL FIELD

The disclosure relates to a method for mounting a rolling bearing unit on the rotor of a turbocharger.

BACKGROUND

It is known for a rotor shaft of a rotor, composed of turbine wheel, compressor wheel and rotor shaft, of an exhaust-gas turbocharger to be rotatably mounted in rolling bearings. The rotor shaft bears the turbine wheel of an exhaust-gas-driven turbine in one end region thereof, and bears the compressor wheel of a compressor in the other end region thereof. The rotor and thus the rotor shaft of an exhaust-gas turbocharger runs, during operation in conjunction with an internal combustion engine, with variable, very high rotational speeds, and must withstand long service lives at high load and high temperatures. An optimized bearing arrangement of the rotor shaft is a fundamental prerequisite for this purpose.

Normally, plain bearing arrangements are used in exhaust-gas turbochargers. Due to the lower friction, plain bearing arrangements are increasingly being replaced by rolling bearings. It is typically the case in such an arrangement, that two rolling bearings are provided, which each have rolling elements. The rolling bearings are each assigned radially inner bearing elements, for example, inner bearing rings. These are each connected in positively locking or non-positively locking fashion to the shaft, or form an integral constituent part of the shaft. Furthermore, the rolling bearings are assigned in each case one outer bearing element, for example, a bearing sleeve element. Here, the two bearing sleeve elements may be arranged separately or else may be combined in a common bearing sleeve, or may be combined with one another in some other way. The inner bearing elements and the outer bearing elements each have running surfaces or raceways for the rolling elements, on which the rolling elements roll. The embodiment and arrangement of the running surfaces or raceways and the rolling elements are in this case selected or designed such that the rolling bearings can accommodate both radial bearing forces and axial bearing forces.

Here, with regard to the axial position and the axial play of the bearing arrangement, it is important that, for the purposes of an adjustment of the two rolling bearings, the axial spacing between the inner and outer bearing elements can be coordinated or adapted to the axial spacing between the two bearing sleeve elements, and the axial position of the rolling bearings in the accommodating bearing housing is defined.

Problems arise for example in the event of temperature changes that occur during operation, in the case of which a length expansion of the rotor shaft and/or of the outer bearing sleeve occurs, which can result in a loss of adjustment of the bearings (enlargement or decrease of the bearing play). The assembly of such a bearing arrangement in an accommodating bearing housing can also be cumbersome.

WO 2012/079881 A1 has disclosed a shaft bearing arrangement for an exhaust-gas turbocharger, which has two separate outer bearing rings which are coupled and are preloaded by means of a spring arrangement, where the rolling bearings are rendered free from play, and the position in relation to the rotor shaft is fixed.

The journal MTZ, 72nd volume, April 2011, pages 302-307, discloses a ball bearing unit for the rotor shaft of an exhaust-gas turbocharger. The ball bearing unit has two inner bearing shells composed of high-temperature-resistant bearing steel, which in the assembled state are pressed onto the rotor shaft of the exhaust-gas turbocharger. The balls of the ball bearing are composed of metal or ceramic and are held and guided separately from one another by means of a coated steel cage (may also be plastic). Here, the outer bearing sleeve elements are combined in a common bearing sleeve and are produced from a high-grade bearing steel.

Furthermore, the applicant's DE 10 2014 212 155.8 describes a bearing device for a shaft of an exhaust-gas turbocharger device of an internal combustion engine, which bearing device has at least two axially mutually spaced-apart rolling bearings with rolling elements. Here, in each of the rolling bearings, for the rolling elements, an inner running surface is arranged directly on the rotor shaft and an outer running surface is provided in a respectively associated outer bearing sleeve element. The two bearing sleeve elements are positioned coaxially with respect to one another by a common guide device and are thus combined to form a unit. The guide device converts a rotation of at least one of the bearing sleeve elements about the shaft longitudinal axis into a change in spacing of the two bearing sleeve elements, where the two bearing sleeve elements can be adjusted and/or fixed in the axial direction with regard to their spacing to one another and/or can be preloaded by a spring element.

The applicant's DE 10 2014 220 618.9 describes a bearing unit for the rotor, which has a rotor shaft, of an exhaust-gas turbocharger, which bearing unit has a bearing housing with a compressor side for connection to a compressor housing of the exhaust-gas turbocharger, a turbine side for connection to a turbine housing of the exhaust-gas turbocharger, and a cylindrical bearing-receiving opening with a bearing device received therein. The bearing-receiving opening is delimited in a radial direction by an inner shell of the bearing housing. The bearing device has two rolling bearings which are spaced apart from one another in an axial direction and of which one is arranged in the bearing housing at the turbine side and the other is arranged in the bearing housing at the compressor side. Each of the rolling bearings is assigned, for the rolling elements thereof, an inner bearing element with an inner running surface on the rotor shaft of the rotor and an outer bearing sleeve element with an outer running surface. The two outer bearing sleeve elements are positioned and fixed on a common guide concentrically and in an axial direction with respect to one another, in such a way that they form a bearing sleeve unit and it is ensured that the rolling bearings are free from play. The inner shell of the bearing housing has a step-like abutment shoulder. The outer diameters of the two bearing sleeve elements differ. The bearing sleeve element with the larger outer diameter bears in an axial direction against the abutment shoulder of the inner shell of the bearing housing.

DE 11 2010 001 779 T5 has disclosed a turbocharger which has a rolling bearing insert inserted into its bearing housing. The rolling bearing insert includes at least one inner running ring and at least one outer running ring and a row of rolling elements, each of which is in contact with one of the inner running rings and one of the outer running rings. In the turbocharger, an undesired rotation of the outer running ring in the mounted state is prevented using separate structural elements, for example using recesses and projections.

SUMMARY

The disclosure provides an improved method for mounting a rolling bearing unit onto a rotor and into a bearing housing of a turbocharger. In addition, the disclosure provides a turbocharger produced in accordance with the method.

One aspect of the disclosure provides a method for mounting a rolling bearing arrangement onto the rotor and into the bearing housing of a turbocharger. The method includes inserting a component into the intermediate space between two rolling bearings of the rotor assembly. The component is deformable under the exertion of pressure. The rotor assembly includes a rotor shaft, inner bearing rings which are fastened to the rotor shaft or integrated into the rotor shaft and which have a spacing to one another, rolling elements which are inserted into the inner bearing rings, and outer bearing rings which likewise have a spacing to one another. The method also includes deforming, by exertion of pressure, the component that has been inserted into the intermediate space between the two rolling bearings, to set a desired preload between the outer bearing rings of the rolling elements.

Implementations of the disclosure may include one or more of the following optional features. In some implementations, the deformable component is a deformable sheet-metal formed part. The deformation of the deformable component may be performed directly within the bearing housing or in an external deformation device. In some examples, the deformation is performed by exertion of hydraulic pressure, which is achieved by pressed-in oil, or by mechanical pressure.

The outer bearing rings and/or the inner shell of the bearing housing may be of asymmetrical form, such that, when pressure is exerted on the deformable component, the shape thereof adapts to the asymmetrical shape of the outer bearing rings and/or of the inner shell of the bearing housing, where an anti-rotation lock is formed.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

A turbocharger has a turbine, a compressor, and a bearing unit. The turbine includes a turbine wheel arranged in a turbine housing. The compressor includes a compressor wheel arranged in a compressor housing. The turbine wheel is fastened to a rotor shaft in the end region of the rotor shaft. The compressor wheel is fastened to the rotor shaft in the other end region of the rotor shaft. The rotor shaft is mounted in a bearing housing of the bearing unit. The turbine housing is connected to the bearing housing on the turbine side, and the compressor housing is connected to the bearing housing on the compressor side. A bearing device which includes rolling bearings is arranged in the bearing housing. The rolling bearings belong to a rotor assembly, which includes the rotor shaft, inner bearing rings which are fastened to the rotor shaft or integrated into the rotor shaft and which have a spacing to one another, rolling elements which are inserted into the inner bearing rings, and outer bearing rings which likewise have a spacing to one another.

During the assembly of the turbocharger, the rotor assembly is inserted into the bearing housing of the turbocharger.

The disclosure provides a method for mounting a rolling bearing unit onto the rotor and into the bearing housing of a turbocharger. In the method, a component which is deformable under the exertion of pressure, for example, a sheet-metal formed part, is inserted into the intermediate space between the two rolling bearings of the rotor assembly. In addition, the component that has been inserted into the intermediate space between the two rolling bearings is deformed, by exertion of pressure, in order to set a desired preload between the outer bearing rings of the rolling elements and thus between the two rolling elements. The deformation of the component that is deformable under the action of pressure may be performed within the bearing housing or in an external deformation device.

In some examples, the outer bearing rings and/or the inner shell of the bearing housing have an asymmetrical shape, and the deformable component adapts, during its deformation, to the asymmetrical shape. An anti-rotation lock is thereby achieved.

Figure 1:
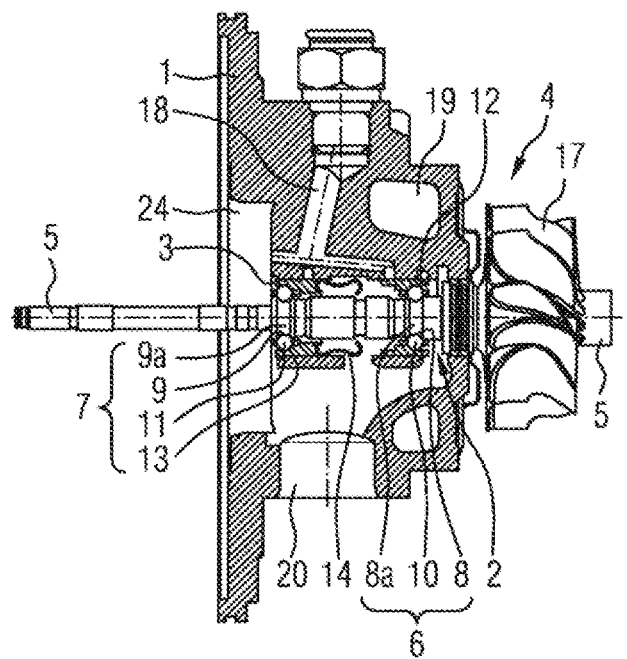
FIGS. 1-3 are longitudinal sectional illustrations for the explanation of a first exemplary method according to the disclosure.
Figure 2:
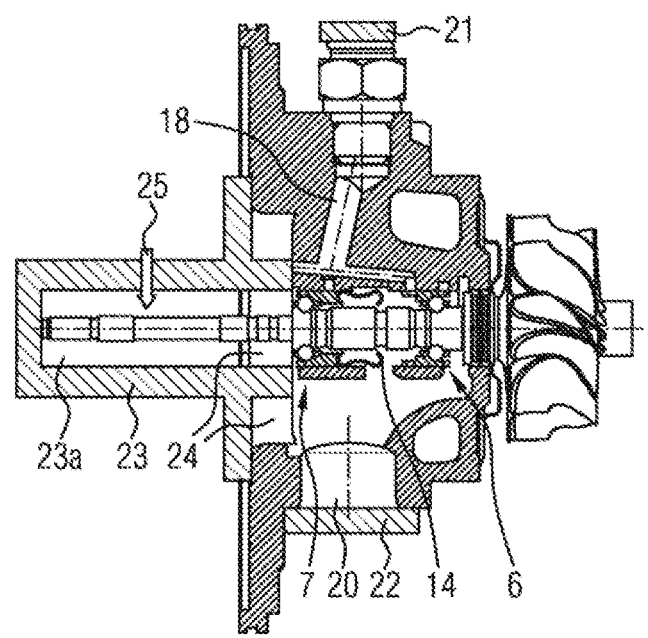
Figure 3:
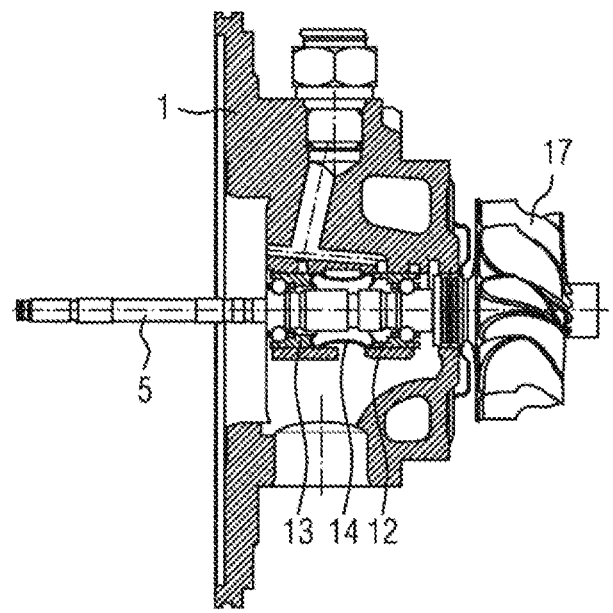

FIGS. 1-3 are longitudinal sectional illustrations for the explanation of a first exemplary example for a method according to the disclosure.

In the first example, a rotor assembly 4 is firstly assembled which includes a rotor shaft 5, inner bearing rings 8 and 9 which are fastened to the rotor shaft 5 or integrated into the rotor shaft 5 and which have a spacing to one another. The rotor assembly 4 also includes rolling elements 10 and 11 which are inserted into the inner bearing rings, and outer bearing rings 12 and 13 which likewise have a spacing to one another. Furthermore, in this example, the rotor assembly 4 also includes a turbine wheel 17 fastened to the rotor shaft 5. Furthermore, the rotor assembly 4 has a component 14 which is deformable under the exertion of pressure. In some examples, the component is a sheet-metal formed part that may be of undulating form. The component 14 which is deformable under pressure is inserted loosely into the intermediate space between the two rolling bearings 6 and 7 of the rotor assembly 4. The rolling bearing 6 includes the inner bearing ring 8, an inner running surface 8a, the outer bearing ring 12, and rolling elements 10. The rolling bearing 7 includes the inner bearing ring 9, an inner running surface 9a, the outer bearing ring 13 and rolling elements 11.

The rotor assembly 4 assembled as described above is inserted into a bearing-receiving opening 2 of the bearing housing 1 of the turbocharger, as illustrated in FIG. 1. Furthermore, the bearing housing 1 has a lubricating oil feed 18, through which lubricating oil is fed to the bearings during the later operation of the turbocharger, a water core 19, and a lubricating oil outlet 20.

After the insertion of the rotor assembly 4 into the bearing-receiving opening of the bearing housing 1, the component 14 that is deformable under the action of pressure is still arranged in the undeformed, loose state between the two rolling bearings 6 and 7.

After the insertion of the rotor assembly 4 into the bearing-receiving opening 2 of the bearing housing 1, the openings of the bearing housing 1 are closed by suitable covers 21, 22, 23. Here, the lubricating oil feed 18 is closed by the cover 21, the lubricating oil outlet 20 is closed by the cover 22, and the compressor-side opening 24 of the bearing housing 1 is closed by the cover 23. The closed state is illustrated in FIG. 2.

After the openings of the bearing housing are closed by the covers 21, 22, 23, hydraulic oil is fed through a feed opening provided in the cover 23, as is indicated by the arrow 25 in FIG. 2.

The hydraulic oil flows firstly into the interior space 23a of the cover 23 and from there through the rolling bearing 7 into the intermediate space between the rolling bearings 7 and 6, in which the deformable component 14 is situated. The hydraulic oil flow exerts pressure on the deformable component 14, which causes the component 14 to deform in a predefined manner. As a result of this deformation, the component 14 comes into contact both with the outer bearing ring 12 of the rolling bearing 6 and with the outer bearing ring 13 of the rolling bearing 7, and is braced between the two outer bearing rings. This results, in a manner dependent on the set oil pressure of the fed hydraulic oil, to a desired preload between the two outer bearing rings 12 and 13, and thus between the two rolling bearings 6 and 7.

After the above-described deformation of the component 14 and the resulting setting of a desired preload between the two outer bearing rings 12 and 13 of the rolling bearings 6 and 7, the fed hydraulic oil is discharged through the lubricating oil outlet 20, and the covers 21, 22 and 23 are removed again. This state is shown in FIG. 3, which illustrates the bracing, effected by the exertion of pressure, of the component 14 between the two outer bearing rings 12 and 13.

In the above-described method, instead of a rigid component or a spring element, a deformable component 14 is used for setting a desired preload between the two rolling bearings, where the deformable component 14 is initially inserted loosely into the intermediate space between the two rolling bearings and is then deformed within the bearing housing through the exertion of hydraulic pressure. After the deformation process, the geometry of the component 14 is fixed, and remains unchanged during the later operation of the turbocharger. Depending on the selection of the hydraulic oil pressure and the selected initial form of the deformable component 14, it is possible for a desired axial preload to be set between the two rolling bearings.

Figure 4:
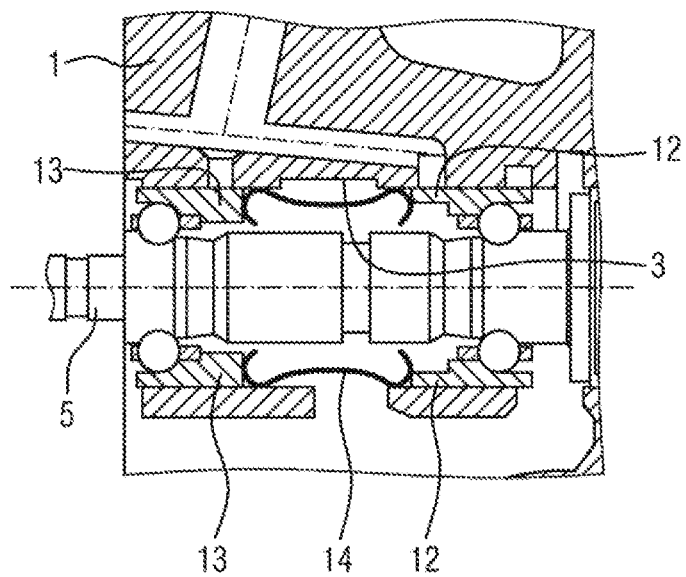
FIG. 4 is a longitudinal sectional illustration for the explanation of an example of the disclosure.

In some examples, shown in FIG. 4, the deformation of the deformable component 14 results in an anti-rotation lock. For this purpose, the outer bearing rings 12, 13 of the rolling bearings and/or the inner shell 3 of the bearing housing 1 have a circumferentially asymmetrical shape. The circumferentially asymmetrical shape may be achieved, for example, through the introduction of grooves, knurlings, studs etc. into the outer bearing rings 12, 13 and/or the inner shell 3 of the bearing housing 1.

Figure 5:
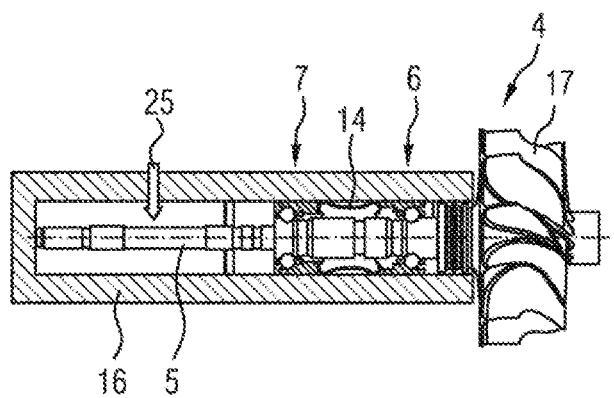
FIG. 5 is a longitudinal sectional illustration for the explanation of a second exemplary method according to the disclosure.

FIG. 5 is a longitudinal sectional illustration for the explanation of a second example for a method according to the disclosure. In the second example, the deformation of the component 14 inserted loosely into the intermediate space between the two rolling bearings is performed not in the bearing housing 1 of the turbocharger, but in an external deformation device 16.

In the second example, as in the first example, a rotor assembly 4 is firstly assembled which has a rotor shaft 5, inner bearing rings 8 and 9 which are fastened to the rotor shaft 5 or integrated into the rotor shaft 5 and which have a spacing to one another, rolling elements 10 and 11 which are inserted into the inner bearing rings, and outer bearing rings 12 and 13 which likewise have a spacing to one another. Furthermore, in this example, the rotor assembly 4 also includes a turbine wheel 17 fastened to the rotor shaft 5. Furthermore, the rotor assembly 4 has a component 14 which is deformable under the exertion of pressure, which component may be a sheet-metal formed part which, in the example shown, is of undulating form. The component 14, which is deformable under the action of pressure, is inserted loosely into the intermediate space between the two rolling bearings 6 and 7 of the rotor assembly. The rolling bearing 6 includes the inner bearing ring 8, an inner running surface 8a, the outer bearing ring 12 and rolling elements 10. The rolling bearing 7 includes the inner bearing ring 9, an inner running surface 9a, the outer bearing ring 13 and rolling elements 11.

The assembled rotor assembly 4 as described above is inserted into the external deformation device 16, where the turbine wheel 17 remains outside the external deformation device 16, and where the external deformation device 16 is, in its region adjacent to the turbine wheel 17, connected in liquid-tight fashion to the rotor assembly 4.

After the insertion of the rotor assembly 4 into the external deformation device 16, hydraulic oil is fed through a feed opening in the external deformation device 16, as is indicated by the arrow 25 in FIG. 5.

The hydraulic oil flows through the feed opening into the interior space of the external deformation device and from there through the rolling bearing 7 into the intermediate space between the rolling bearings 7 and 6, in which the deformable component 14 is situated. The oil flow exerts pressure on the deformable component 14, which causes the component 14 to deform. As a result of this deformation, the component 14 comes into contact both with the outer bearing ring 12 of the rolling bearing 6 and with the outer bearing ring 13 of the rolling bearing 7, and is braced between the two outer bearing rings. This results, in a manner dependent on the set oil pressure of the fed hydraulic oil, to a desired preload between the two outer bearing rings 12 and 13, and thus between the rolling bearings 6 and 7.

After the deformation, the rotor assembly 4 is removed from the external deformation device 16 and is inserted into the bearing-receiving opening 2 of the bearing housing 1.

As shown in FIG. 5, instead of a rigid component or a spring element, a deformable component 14 is used for setting a desired preload between the two rolling bearings, where the deformable component 14 is initially inserted loosely into the intermediate space between the two rolling bearings and is then deformed within an external deformation device through the exertion of hydraulic pressure. After the deformation process, the geometry of the component 14 is fixed, and remains unchanged during the later operation of the turbocharger. Depending on the selection of the oil pressure and the desired initial form of the deformable component, it is possible in this way for a desired axial preload to be set between the two rolling bearings.

As shown in FIG. 5, the deformation of the deformable component 14 furthermore results in an anti-rotation lock. For this purpose, the outer bearing rings 12, 13 of the rolling bearings and/or the deformation device 16 have a circumferentially asymmetrical shape. The circumferentially asymmetrical shape may be achieved for example through the introduction of grooves into the face surfaces of the outer bearing rings 12, 13 and into the inner contour of the deformation device 16. In some examples, the groove in the inner contour of the deformation device 16 corresponds to the groove in the inner shell 3 of the bearing housing 1, into which the rotor assembly 4 is inserted after removal from the external deformation device 16.

Figure 6:
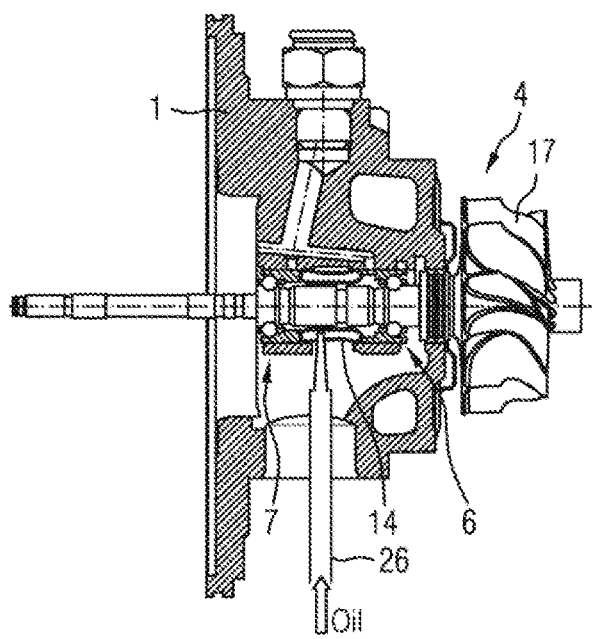
FIG. 6 is a longitudinal sectional illustration for the explanation of a first alternative example of the disclosure.

FIG. 6 is a longitudinal sectional illustration for the explanation of a first alternative example of the disclosure.

In the first alternative example, as a deformable component 14, a closed insert ring, which is composed for example of sheet metal, is inserted loosely into the intermediate space between the two rolling bearings 6 and 7 and is then acted on with hydraulic oil, using a lance 26, until it has the desired shape or until the desired axial preload between the two rolling bearings is achieved.

Figure 7:
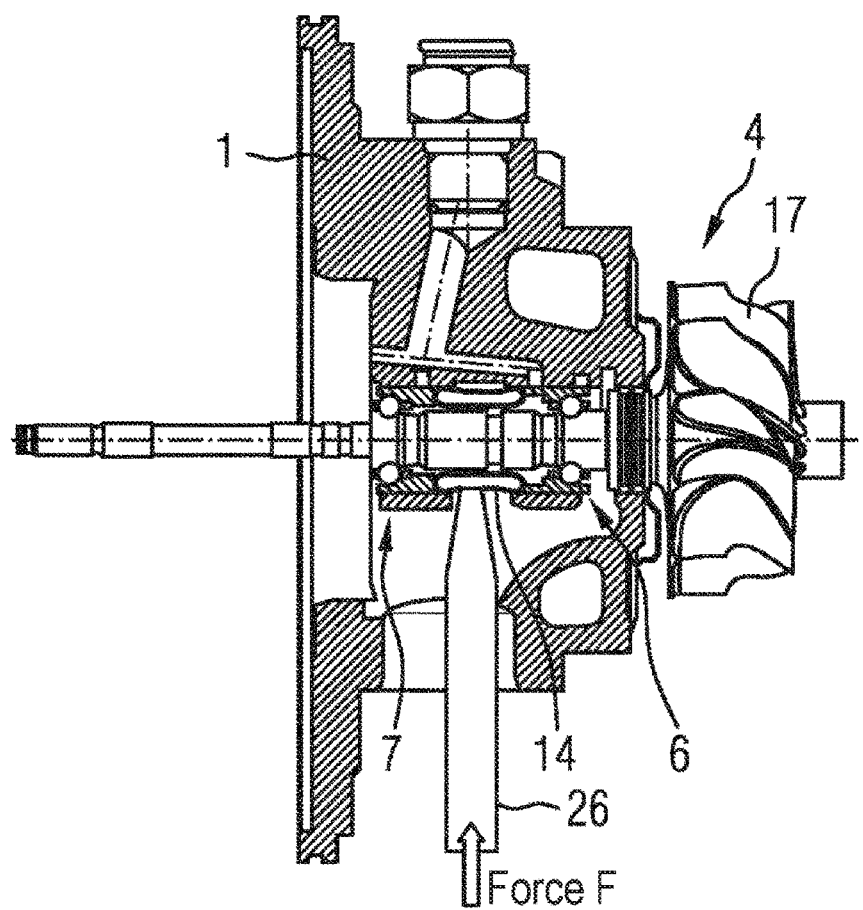
FIG. 7 is a longitudinal sectional illustration of a second alternative example of the disclosure.

FIG. 7 is a longitudinal sectional illustration for the explanation of a second alternative example of the disclosure.

In the second alternative example, as a deformable component 14, a closed insert ring is again used, which is composed for example of sheet metal, is inserted loosely into the intermediate space between the two rolling bearings 6 and 7 and is then mechanically deformed, using a lance 26 on which a mechanical force F is exerted, until it has the desired shape or until the desired axial preload between the two rolling bearings is set.

FIGS. 8-13 are longitudinal sectional illustrations for the explanation of a third example for a method according to the disclosure.

In the third example, as in the first example, a deformation of the deformable component 14 is performed within the bearing housing 1 using hydraulic oil. As an alternative to this, use may also be made of water or compressed air etc.

In the third example, too, a rotor assembly 4 is firstly assembled which includes a rotor shaft 5, inner bearing rings 8 and 9 which are fastened to the rotor shaft 5 or integrated into the rotor shaft 5 and which have a spacing to one another, rolling elements 10 and 11 which are inserted into the inner bearing rings, and outer bearing rings 12 and 13 which likewise have a spacing to one another. Furthermore, the rotor assembly 4 also includes a turbine wheel 17 fastened to the rotor shaft 5. Furthermore, the rotor assembly 4 has a component 14 which is deformable under the exertion of pressure, which component 14 is preferably a sheet-metal formed part which, in the example shown, has an indentation. The component 14 which is deformable under the action of pressure is inserted loosely into the intermediate space between the two rolling bearings 6 and 7 of the rotor assembly. The rolling bearing 6 includes the inner bearing ring 8, an inner running surface 8a, the outer bearing ring 12 and rolling elements 10. The rolling bearing 7 includes the inner bearing ring 9, an inner running surface 9a, the outer bearing ring 13 and rolling elements 11.

Figure 8:
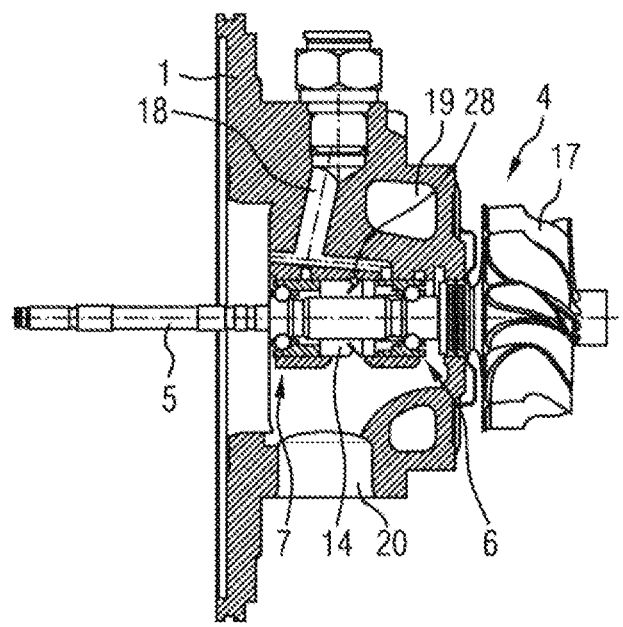
FIGS. 8-13 are longitudinal sectional illustrations for the explanation of a third exemplary method according to the disclosure.

The rotor assembly 4 assembled as described above is inserted into a bearing-receiving opening 2 of the bearing housing 1 of the turbocharger, as illustrated in FIG. 8. The bearing housing furthermore has a lubricating oil feed 18, through which lubricating oil is fed to the bearings during the later operation of the turbocharger, a water core 19, and a lubricating oil outlet 20. Furthermore, the inner shell 3 of the bearing housing has an indentation 28.

After the insertion of the rotor assembly 4 into the bearing-receiving opening of the bearing housing 1, the component 14 that is deformable under the action of pressure is still arranged in the undeformed, loose state between the two rolling bearings 6 and 7.

Figure 9:
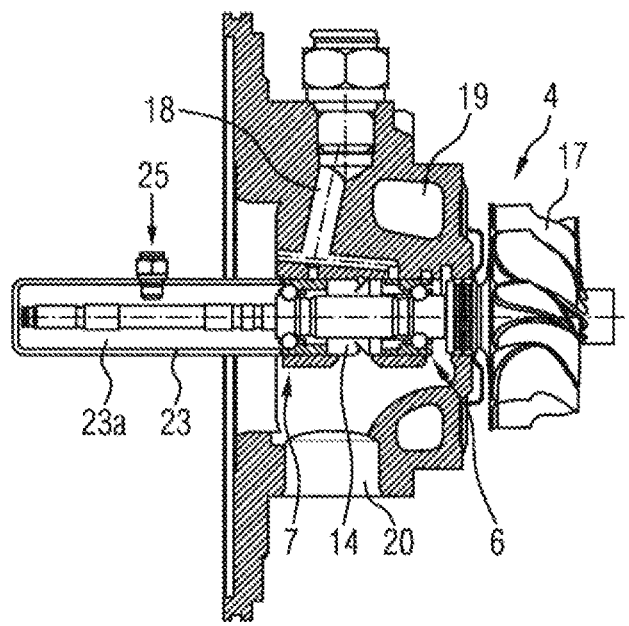

After the insertion of the rotor assembly 4 into the bearing-receiving opening 2 of the bearing housing 1, the openings of the bearing housing 1 are closed by suitable covers, of which, in FIG. 9, only a cover 23 which closes the compressor-side opening of the bearing housing is illustrated.

After the openings of the bearing housing are closed by the covers, hydraulic oil is fed through a feed opening provided in the cover 23, as is indicated by the arrow 25 in FIG. 9.

Figure 10:
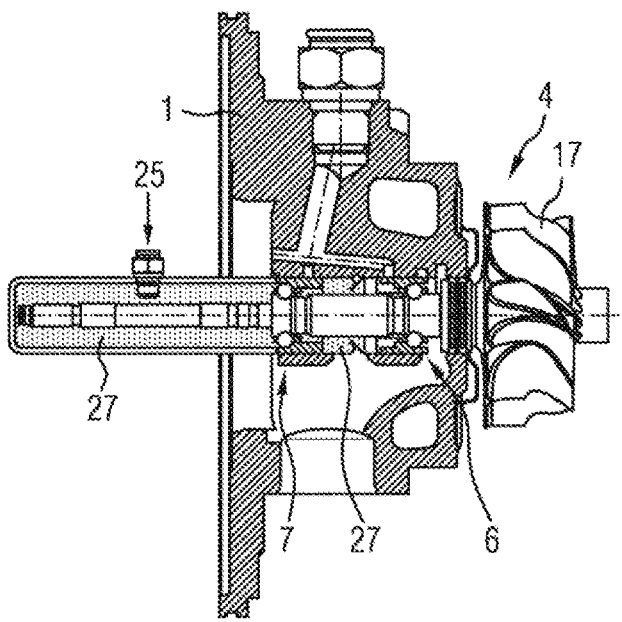

The hydraulic oil 27 flows firstly into the interior space 23a of the cover 23 and from there through the rolling bearing 7 into the intermediate space between the rolling bearings 7 and 6, in which the deformable component 14 is situated, as illustrated in FIG. 10.

Figure 11:
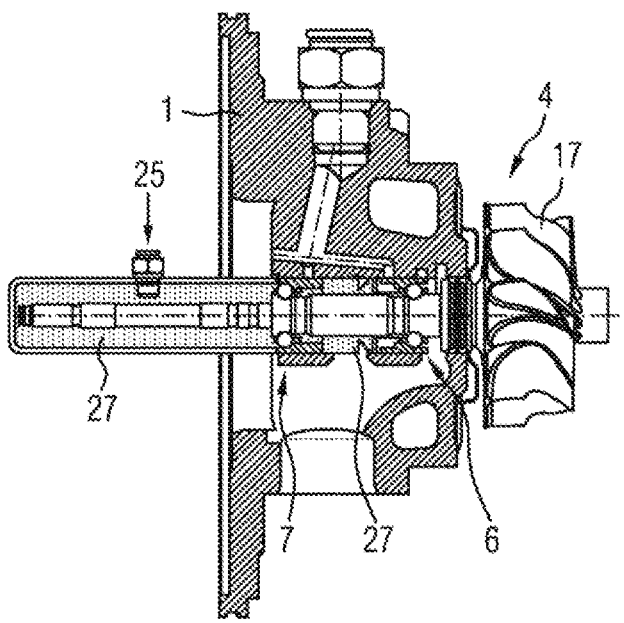

FIG. 11 illustrates how the pressure that is exerted on the deformable component 14 by the hydraulic oil causes the rear end region of the deformable component 14 in the pressure direction to be pushed in the direction of the outer bearing ring of the rolling bearing 6.

Figure 12:
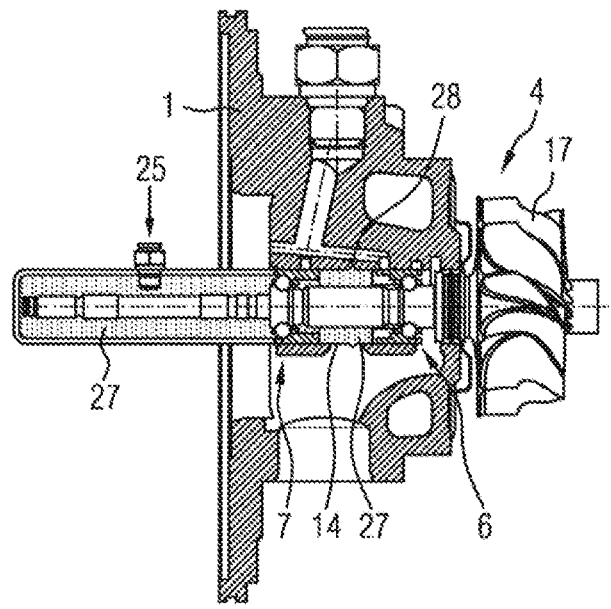

This exertion of pressure by pressing-in of the hydraulic oil occurs until the deformable component 14 is braced between the two outer bearing rings of the rolling bearings, the desired axial preload exists between the two rolling bearings, and the component 14 also fills the region of the indentation 28 in the inner shell 3 of the bearing housing 1. This is illustrated in FIG. 12.

Figure 13:
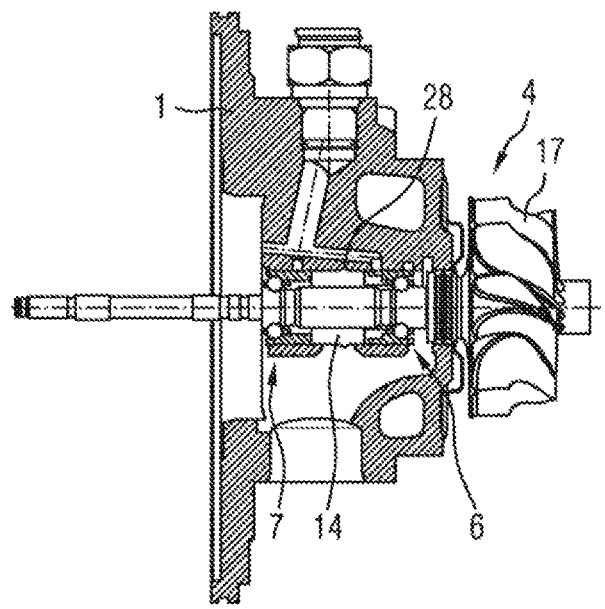

Finally, FIG. 13 shows the end state of the deformation process, after the hydraulic oil has been discharged and the cover 23 has been removed again. Since the deformed component 14 not only ensures the desired axial preload between the two rolling bearings but also fills the region of the indentation 28 of the inner shell of the bearing housing, an anti-rotation lock is also achieved.

With the use of the disclosure described above, the need to use complex components that involve complex machining is eliminated. Furthermore, the above-described deformation of the deformable component also results in a compensation of component tolerances, which is advantageous in particular in the case of mass production. Furthermore, tolerances of the surrounding components can be dimensioned to be larger, because the setting of the desired axial preload between the rolling bearings is achieved by the deformation of a loosely inserted deformable component. Furthermore, the use of such a deformable component, which is composed for example of sheet metal, is less expensive than the setting of the desired axial preload by means of a spring.

The disclosure described above, provides the setting of a desired spacing between two rolling bearings, the setting of a desired preload between two rolling bearings, a compensation of component tolerances, prevention of rotation of the outer bearing rings relative to the deformed component and to the bearing housing.

In the method described above, the setting of a desired preload between the two rolling bearings is achieved by bracing of the deformable component between the two outer bearing rings of the rolling bearings. As an alternative to this, the desired preload may also be set by bracing of the deformable component between the two inner bearing rings of the rolling bearings.

A number of implementations have been described. Nevertheless, it will be understood that various modifications may be made without departing from the spirit and scope of the disclosure. Accordingly, other implementations are within the scope of the following claims.

What is claimed is:

1. A method for mounting a rolling bearing arrangement onto a rotor and into the bearing housing of a turbocharger, the method comprising:
    inserting a component, which is deformable under an exertion of pressure, into an intermediate space between two rolling bearings of a rotor assembly, which rotor assembly includes a rotor shaft, inner bearing rings which are fastened to the rotor shaft or integrated into the rotor shaft and which have a spacing to one another, rolling elements which are inserted into the inner bearing rings, and outer bearing rings which likewise have a spacing to one another; and
    deforming, by exertion of pressure, the component that has been inserted into the intermediate space between the two rolling bearings to set a desired axial preload between the two rolling bearings,
    wherein the deformation of the component that has been inserted into the intermediate space between the two rolling bearings is performed such that, to form an anti-rotation lock, the deformed component adapts to a circumferentially asymmetrical shape of the outer bearing rings and/or of an inner shell of the bearing housing.

2. The method of claim 1, wherein the deformation of the component that has been inserted into the intermediate space between the two rolling bearings is performed by exertion of hydraulic, pneumatic and/or mechanical pressure.

3. The method of claim 2, wherein the deformation of the component that has been inserted into the intermediate space between the two rolling bearings is performed in the bearing housing of the turbocharger.

4. The method of claim 1, wherein following the deforming, the component is fixed in shape.

5. The method of claim 1, wherein deforming the component that has been inserted into the intermediate space between the two rolling bearings comprises exertion of hydraulic pressure.

6. The method of claim 1, wherein deforming the component that has been inserted into the intermediate space between the two rolling bearings comprises exertion of pneumatic pressure.

7. The method of claim 1, wherein deforming the component that has been inserted into the intermediate space between the two rolling bearings comprises exertion of mechanical pressure.

8. The method of claim 1, wherein the deforming is performed during mounting of the rolling bearing arrangement onto the rotor and into the bearing housing of the turbocharger.

9. The method of claim 1, wherein prior to the deforming, the component comprises an indentation, and the deforming fills the indentation.

10. The method of claim 1, wherein the bearing housing includes one or more openings, and deforming the component comprises covering the one or more openings of the bearing housing, supplying a fluid under pressure into the bearing housing through an opening of the one or more openings thereof so that the fluid deforms the component, discharging the fluid from the bearing housing and removing the covering.

11. The method of claim 1, wherein deforming the component comprises mechanically deforming the component using a lance.

12. The method of claim 1, wherein deforming the component comprises directing a fluid under pressure onto the component.

13. A method for mounting a rolling bearing arrangement onto a rotor and into the bearing housing of a turbocharger, the method comprising:
    inserting a component, which is deformable under an exertion of pressure, into an intermediate space between two rolling bearings of a rotor assembly, which rotor assembly includes a rotor shaft, inner bearing rings which are fastened to the rotor shaft or integrated into the rotor shaft and which have a spacing to one another, rolling elements which are inserted into the inner bearing rings, and outer bearing rings which likewise have a spacing to one another; and
    deforming, by exertion of pressure, the component that has been inserted into the intermediate space between the two rolling bearings to set a desired axial preload between the two rolling bearings,
    wherein the deformation of the component that has been inserted into the intermediate space between the two rolling bearings is performed by exertion of hydraulic, pneumatic and/or mechanical pressure, and
    wherein the deformation of the component that has been inserted into the intermediate space between the two rolling bearings is performed in an external deformation device.

14. The method of claim 13, wherein the rotor assembly with the deformed component is inserted into the bearing housing of the turbocharger.

15. A turbocharger comprising:
    a bearing housing;
    a rotor assembly inserted into the bearing housing, the rotor assembly includes:
        two rolling bearings;
        a rotor shaft;
        inner bearing rings fastened to the rotor shaft or integrated into the rotor shaft and which have a spacing to one another;
        rolling elements which are inserted into the inner bearing rings; and
        outer bearing rings which have a spacing to one another; and
    a deformed component arranged in an intermediate space between the two rolling bearings,
    wherein the outer bearing rings and/or an inner shell of the bearing housing have/has an asymmetrical shape, and, to form an anti-rotation lock, the deformed component is adapted to the asymmetrical shape of the outer bearing rings and/or of the inner shell of the bearing housing.

16. The turbocharger of claim 15, wherein the deformed component is a deformed sheet-metal component.

17. The turbocharger of claim 15, wherein a geometry of the deformed component is fixed.

18. The turbocharger of claim 15, wherein the asymmetrical shape of the outer bearing rings and/or of the inner shell of the bearing housing comprises a circumferentially asymmetrical shape.

\* \* \* \* \*